US012650794B2

(12) United States Patent
Yamasaki et al.

(10) Patent No.: US 12,650,794 B2
(45) Date of Patent: Jun. 9, 2026

(54) INFORMATION PROCESSING SYSTEM, NON-TRANSITORY COMPUTER READABLE MEDIUM, AND INFORMATION PROCESSING METHOD

(71) Applicant: FUJIFILM Business Innovation Corp., Tokyo (JP)

(72) Inventors: Naoto Yamasaki, Kanagawa (JP); Yoshie Ohira, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/178,147

(22) Filed: Mar. 3, 2023

(65) Prior Publication Data

US 2024/0069824 A1 Feb. 29, 2024

(30) Foreign Application Priority Data

Aug. 31, 2022 (JP) ................................ 2022-137953

(51) Int. Cl.
*G06F 3/12* (2006.01)

(52) U.S. Cl.
CPC .......... *G06F 3/1212* (2013.01); *G06F 3/1207* (2013.01); *G06F 3/1252* (2013.01); *G06F 3/126* (2013.01)

(58) Field of Classification Search
CPC .... G06F 3/1212; G06F 3/1207; G06F 3/1252; G06F 3/126
See application file for complete search history.

(56) References Cited

U.S. PATENT DOCUMENTS 9,082,069 B1 * 7/2015 Black .................... G06F 3/1285
2010/0027054 A1 * 2/2010 Reddy ................ H04N 1/00233 358/1.15
2012/0307276 A1 * 12/2012 Takenaka .............. G06K 15/00 358/1.13

FOREIGN PATENT DOCUMENTS

JP 2013-131033 A 7/2013
JP 2013-145528 A 7/2013
JP 2020-204792 A 12/2020

* cited by examiner

*Primary Examiner* — John R Wallace
(74) *Attorney, Agent, or Firm* — Oliff PLC

(57) ABSTRACT

An information processing system includes one or more processors configured to: acquire document data and imposition information, the document data being constituted by multiple pieces of image data, the imposition information being information about imposition of the document data; and, if pieces of image data, among the multiple pieces of image data, to be imposed on one or more pages have been received, the one or more pages being included in multiple pages that serve as printing surfaces of sheets on which the document data is to be printed based on the imposition information, perform control to notify a user that printing of the one or more pages is ready.

16 Claims, 15 Drawing Sheets

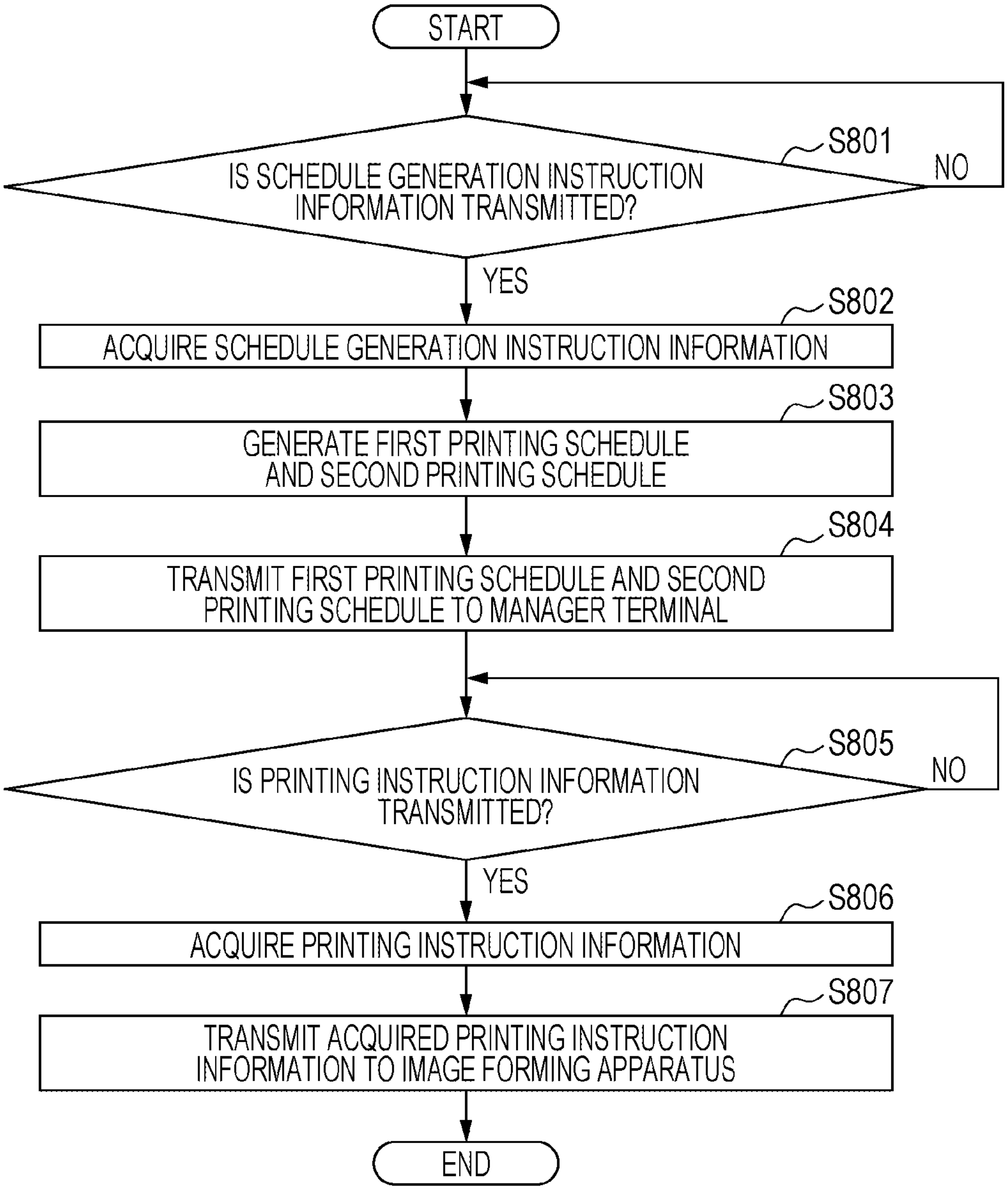

FIG. 8

START

S801
IS SCHEDULE GENERATION INSTRUCTION
INFORMATION TRANSMITTED? — NO

YES

S802
ACQUIRE SCHEDULE GENERATION INSTRUCTION INFORMATION

S803
GENERATE FIRST PRINTING SCHEDULE
AND SECOND PRINTING SCHEDULE

S804
TRANSMIT FIRST PRINTING SCHEDULE AND SECOND
PRINTING SCHEDULE TO MANAGER TERMINAL

S805
IS PRINTING INSTRUCTION INFORMATION
TRANSMITTED? — NO

YES

S806
ACQUIRE PRINTING INSTRUCTION INFORMATION

S807
TRANSMIT ACQUIRED PRINTING INSTRUCTION
INFORMATION TO IMAGE FORMING APPARATUS

END

FIRST BLOCK (1 TO 16)

SECOND BLOCK (17 TO 32)

SECOND BLOCK

| | BACK SIDE | | |
|---|---|---|---|
| 22 | 27 | 26 | 23 |
| 19 | 30 | 31 | 18 |

| | | | |
|---|---|---|---|
| 24 | 25 | 28 | 21 |
| 17 | 32 | 29 | 20 |

FRONT SIDE

FIRST BLOCK

| | BACK SIDE | | |
|---|---|---|---|
| 6 | 11 | 10 | 7 |
| 3 | 14 | 15 | 2 |

| | | | |
|---|---|---|---|
| 8 | 9 | 12 | 5 |
| 1 | 16 | 13 | 4 |

FRONT SIDE

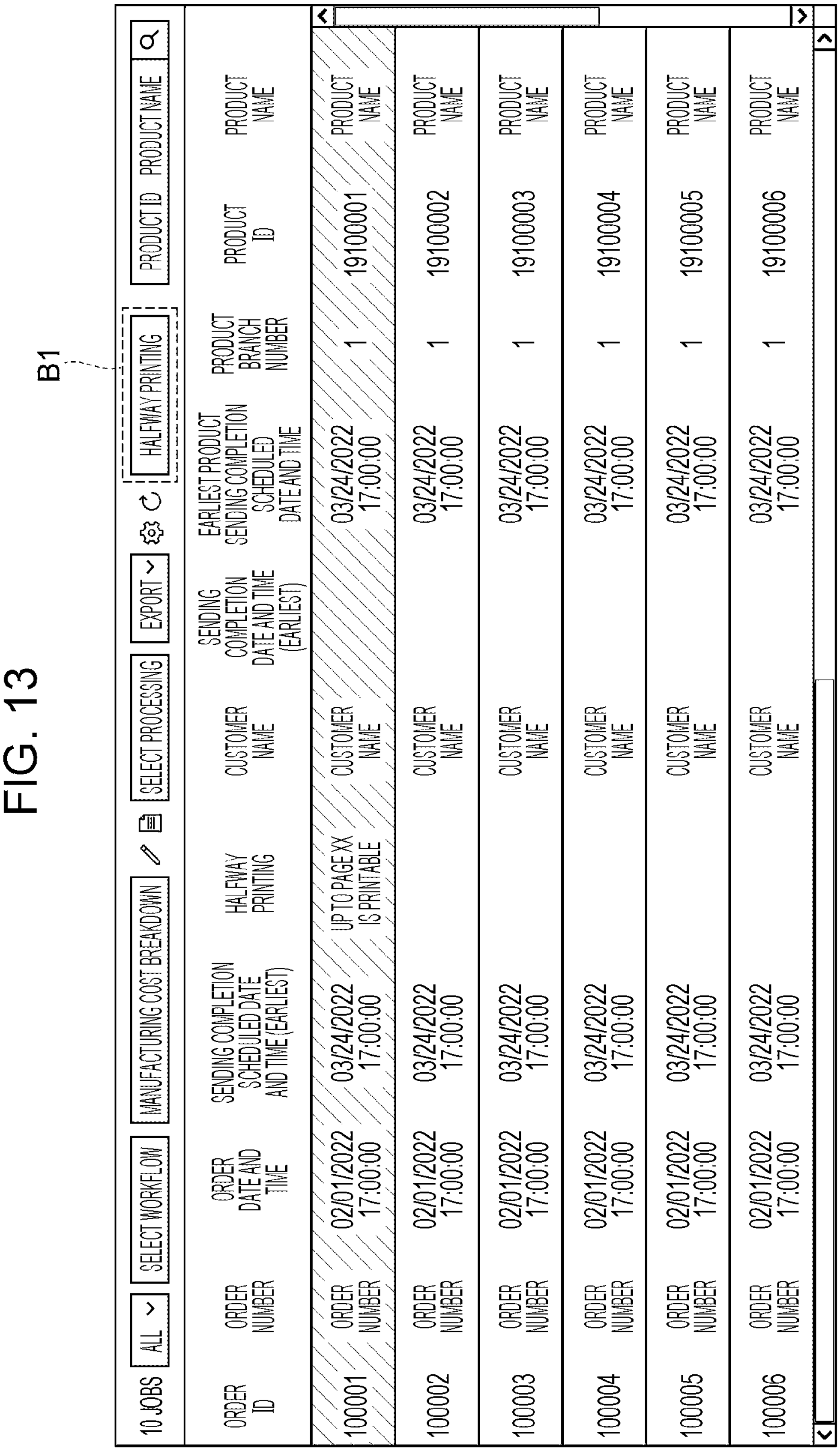

FIG. 13

| 10 JOBS | ALL ∨ | SELECT WORKFLOW | MANUFACTURING COST BREAKDOWN | ✎ | ▤ | SELECT PROCESSING | EXPORT ∨ | ⚙ ↻ | HALFWAY PRINTING | | PRODUCT ID | PRODUCT NAME | 🔍 |

B1

| ORDER ID | ORDER NUMBER | ORDER DATE AND TIME | SENDING COMPLETION SCHEDULED DATE AND TIME (EARLIEST) | HALFWAY PRINTING | CUSTOMER NAME | SENDING COMPLETION DATE AND TIME (EARLIEST) | EARLIEST PRODUCT SENDING COMPLETION SCHEDULED DATE AND TIME | PRODUCT BRANCH NUMBER | PRODUCT ID | PRODUCT NAME |
|---|---|---|---|---|---|---|---|---|---|---|
| 100001 | ORDER NUMBER | 02/01/2022 17:00:00 | 03/24/2022 17:00:00 | UP TO PAGE XX IS PRINTABLE | CUSTOMER NAME | | 03/24/2022 17:00:00 | 1 | 19100001 | PRODUCT NAME |
| 100002 | ORDER NUMBER | 02/01/2022 17:00:00 | 03/24/2022 17:00:00 | | CUSTOMER NAME | | 03/24/2022 17:00:00 | 1 | 19100002 | PRODUCT NAME |
| 100003 | ORDER NUMBER | 02/01/2022 17:00:00 | 03/24/2022 17:00:00 | | CUSTOMER NAME | | 03/24/2022 17:00:00 | 1 | 19100003 | PRODUCT NAME |
| 100004 | ORDER NUMBER | 02/01/2022 17:00:00 | 03/24/2022 17:00:00 | | CUSTOMER NAME | | 03/24/2022 17:00:00 | 1 | 19100004 | PRODUCT NAME |
| 100005 | ORDER NUMBER | 02/01/2022 17:00:00 | 03/24/2022 17:00:00 | | CUSTOMER NAME | | 03/24/2022 17:00:00 | 1 | 19100005 | PRODUCT NAME |
| 100006 | ORDER NUMBER | 02/01/2022 17:00:00 | 03/24/2022 17:00:00 | | CUSTOMER NAME | | 03/24/2022 17:00:00 | 1 | 19100006 | PRODUCT NAME |

2/3

Ja1
POST-PROCESSING SCHEDULE

Ja1
POST-PROCESSING SCHEDULE

2/2

Jp1-2
PRINTING SCHEDULE (2)

2/1 Jp1
PRINTING SCHEDULE

Jp1-1
PRINTING SCHEDULE (1)

BEFORE DIVIDING

AFTER DIVIDING

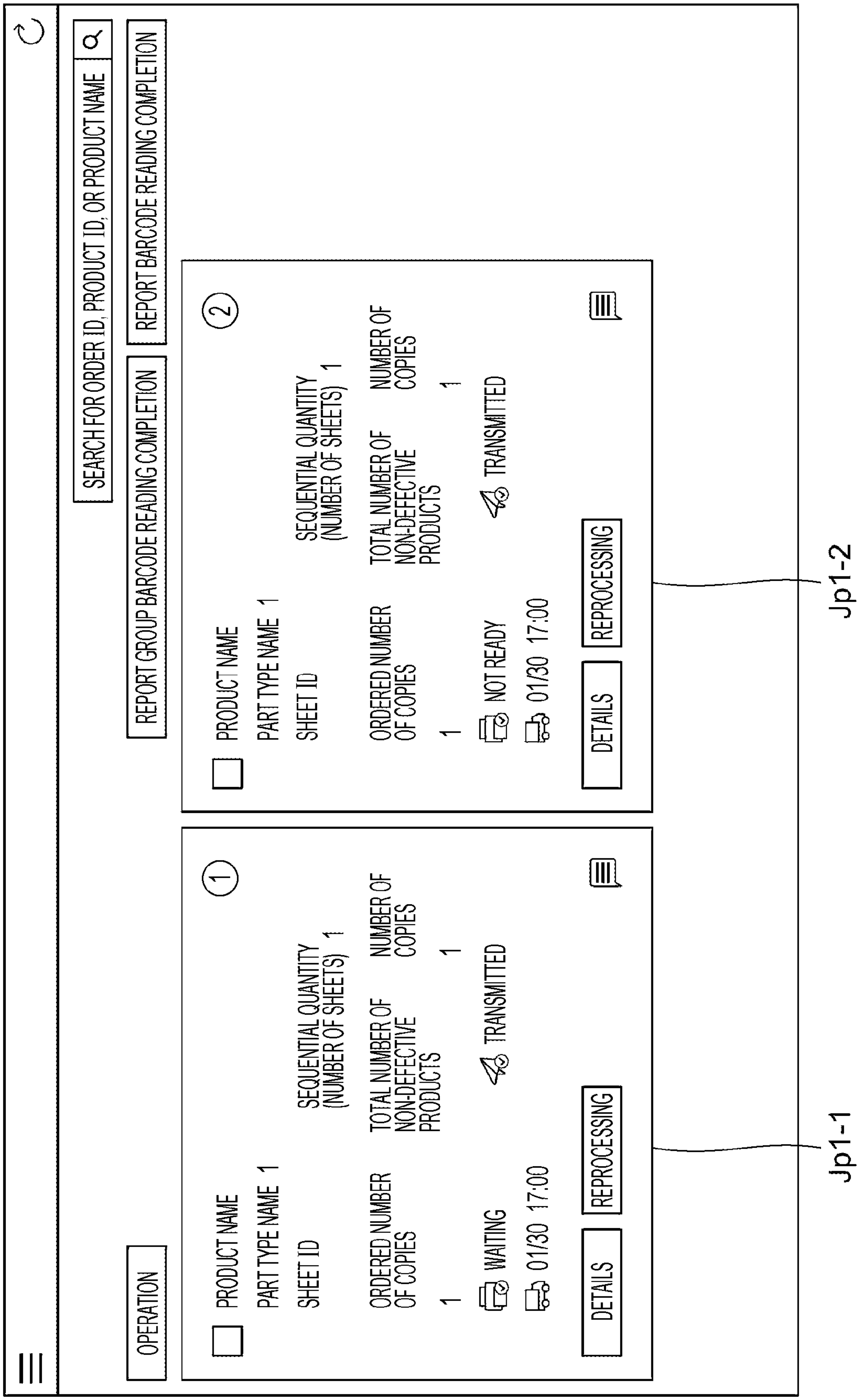

FIG. 15

SEARCH FOR ORDER ID, PRODUCT ID, OR PRODUCT NAME 🔍

OPERATION | REPORT GROUP BARCODE READING COMPLETION | REPORT BARCODE READING COMPLETION

↻

① 📃

☐ PRODUCT NAME
PART TYPE NAME 1

SHEET ID       SEQUENTIAL QUANTITY    NUMBER OF
             (NUMBER OF SHEETS) 1    COPIES

ORDERED NUMBER    TOTAL NUMBER OF       1
OF COPIES           NON-DEFECTIVE
              PRODUCTS

1

🖨 WAITING         ⬀ TRANSMITTED

🚚 01/30 17:00

DETAILS | REPROCESSING

Jp1-1

② 📃

☐ PRODUCT NAME
PART TYPE NAME 1

SHEET ID       SEQUENTIAL QUANTITY    NUMBER OF
             (NUMBER OF SHEETS) 1    COPIES

ORDERED NUMBER    TOTAL NUMBER OF       1
OF COPIES           NON-DEFECTIVE
              PRODUCTS

1

🖨 NOT READY       ⬀ TRANSMITTED

🚚 01/30 17:00

DETAILS | REPROCESSING

Jp1-2

INFORMATION PROCESSING SYSTEM, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2022-137953 filed Aug. 31, 2022.

BACKGROUND

(i) Technical Field

The present disclosure relates to an information processing system, a non-transitory computer readable medium, and an information processing method.

(ii) Related Art

In the field of printing business, there is known a technique for receiving multiple pieces of image data constituting document data, printing the pieces of image data on sheets of paper, and binding the sheets (for example, Japanese Unexamined Patent Application Publication No. 2020-204792).

SUMMARY

In such a technique, it is necessary to take into consideration an imposition process of arranging multiple pieces of image data on each page that serves as a printing surface of a sheet. Depending on the printing business, it is not possible to start printing sheets, which is a final deliverable form, until all the pieces of image data constituting document data have been received.

Aspects of non-limiting embodiments of the present disclosure relate to a technique that enables starting printing of one or more sheets, which is a final deliverable form, even before completion of receipt of all the pieces of image data constituting document data, which is a printing target, in the printing business including an imposition process.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system comprising one or more processors configured to: acquire document data and imposition information, the document data being constituted by a plurality of pieces of image data, the imposition information being information about imposition of the document data; and, if pieces of image data, among the plurality of pieces of image data, to be imposed on one or more pages have been received, the one or more pages being included in a plurality of pages that serve as printing surfaces of sheets on which the document data is to be printed based on the imposition information, perform control to notify a user that printing of the one or more pages is ready.

BRIEF DESCRIPTION OF THE DRAWINGS

An exemplary embodiment of the present disclosure will be described in detail based on the following figures, wherein:

FIG. 8 is a flowchart illustrating an example of a process flow performed after the support information is transmitted to the manager terminal in the process performed by the management server;

FIG. 13 illustrates a specific example of a user interface displayed on a display of the manager terminal;

FIG. 15 illustrates a specific example of a user interface displayed on a display of the image forming apparatus.

DETAILED DESCRIPTION

Now, an exemplary embodiment of the present disclosure will be described below in detail with reference to the accompanying drawings.

Configuration of Information Processing System

Figure 1:
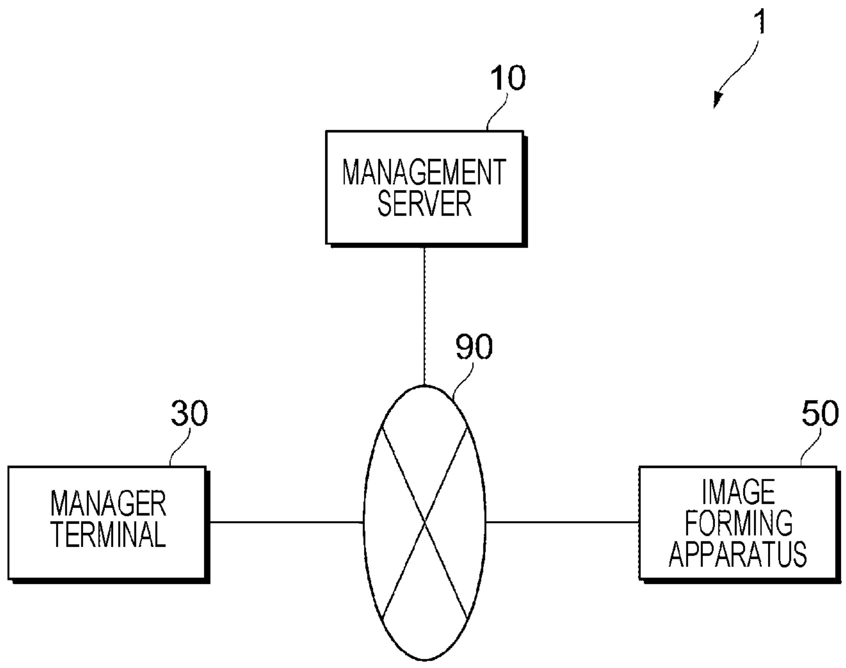
FIG. 1 illustrates an example of an overall configuration of an information processing system to which the exemplary embodiment is applied.

FIG. 1 illustrates an example of an overall configuration of an information processing system 1 to which the exemplary embodiment is applied.

The information processing system 1 is constituted by a management server 10, a manager terminal 30, an image forming apparatus 50 being connected to one another via a network 90. Examples of the network 90 include a local area network (LAN), the Internet, and the like.

The management server 10 is an information processing apparatus serving as a server that manages the entirety of the information processing system 1. The management server 10 acquires various kinds of information transmitted from each of the manager terminal 30 and the image forming apparatus 50 and performs various kinds of processing. In addition, the management server 10 transmits various kinds of information to each of the manager terminal 30 and the image forming apparatus 50.

For example, the management server 10 receives document data constituted by multiple pieces of image data. The management server 10 also receives information about imposition of the document data (hereinafter referred to as "imposition information"). The document data and the imposition information are transmitted from the manager terminal 30. In addition, the management server 10 transmits the received document data and the received imposition information to the image forming apparatus 50. Note that details of the document data and the imposition information will be described later.

Upon receipt of information indicating that the image forming apparatus 50 has acquired all pieces of image data to be imposed on one or more pages of multiple pages that serve as printing surfaces of sheets on which the document data is to be printed, the management server 10 transmits information, to the manager terminal 30, indicating that early printing of the one or more pages whose image data has been received is ready (hereinafter referred to as "halfway printing ready information") before completion of receipt of all the pieces of image data constituting the document data. Note that details of the halfway printing ready information and details of a process performed by the management server 10 will be described later.

The manager terminal 30 is an information processing apparatus operated by a person who manages the business of printing the document data on sheets (hereinafter referred to as "manager") as a user of the information processing system 1. The manager terminal 30 acquires various kinds of information transmitted from each of the management server 10 and the image forming apparatus 50 and performs various kinds of processing. In addition, the manager terminal 30 transmits various kinds of information to each of the management server 10 and the image forming apparatus 50.

For example, the manager terminal 30 transmits the document data, which includes multiple pieces of image data, and the imposition information to the management server 10. In addition, upon the halfway printing ready information being transmitted from the management server 10, the manager terminal 30 acquires the information and displays, on a display, information for notifying the user that early printing of the one or more pages whose image data has been received is ready. Note that details of a process performed by the manager terminal 30 will be described later.

The image forming apparatus 50 is an information processing apparatus that forms images of the image data on sheets, based on the document data. The image forming apparatus 50 also serves as an image output device that outputs a recording medium on which the images are formed. Examples of the image forming apparatus 50 include a so-called a multifunction peripheral of an electrophotographic system, which forms a toner image on a printing surface of a sheet, a so-called inkjet printer, which ejects ink onto a printing surface of a sheet, and the like. For example, the image forming apparatus 50 acquires various kinds of information transmitted from the management server 10 and displays them on a display (e.g., display 56 in FIG. 3, which will be described later). In addition, the image forming apparatus 50 transmits various kinds of information input by an input operation of the user to the management server 10. Note that details of a process performed by the image forming apparatus 50 will be described later.

The above-described configuration of the information processing system 1 is an example, and the information processing system 1 may have any functions for implementing the above-described processing as a whole. Thus, some or all of the functions for implementing the above-described processing may be performed in a distributed or cooperative manner within the information processing system 1. That is, some or all of the functions of the management server 10 may be functions of the manager terminal 30 or the image forming apparatus 50, and some or all of the functions of the manager terminal 30 may be functions of the management server 10 or the image forming apparatus 50. In addition, some or all of the functions of the image forming apparatus 50 may be functions of the management server 10 or the manager terminal 30. Furthermore, some or all of the functions of each of the management server 10, the manager terminal 30, and the image forming apparatus 50, which constitute the information processing system 1, may be delegated to another server or the like not illustrated. Thus, the processing performed by the entire information processing system 1 is promoted, and the processing can be complemented.

Hardware Configuration of Management Server

Figure 2:
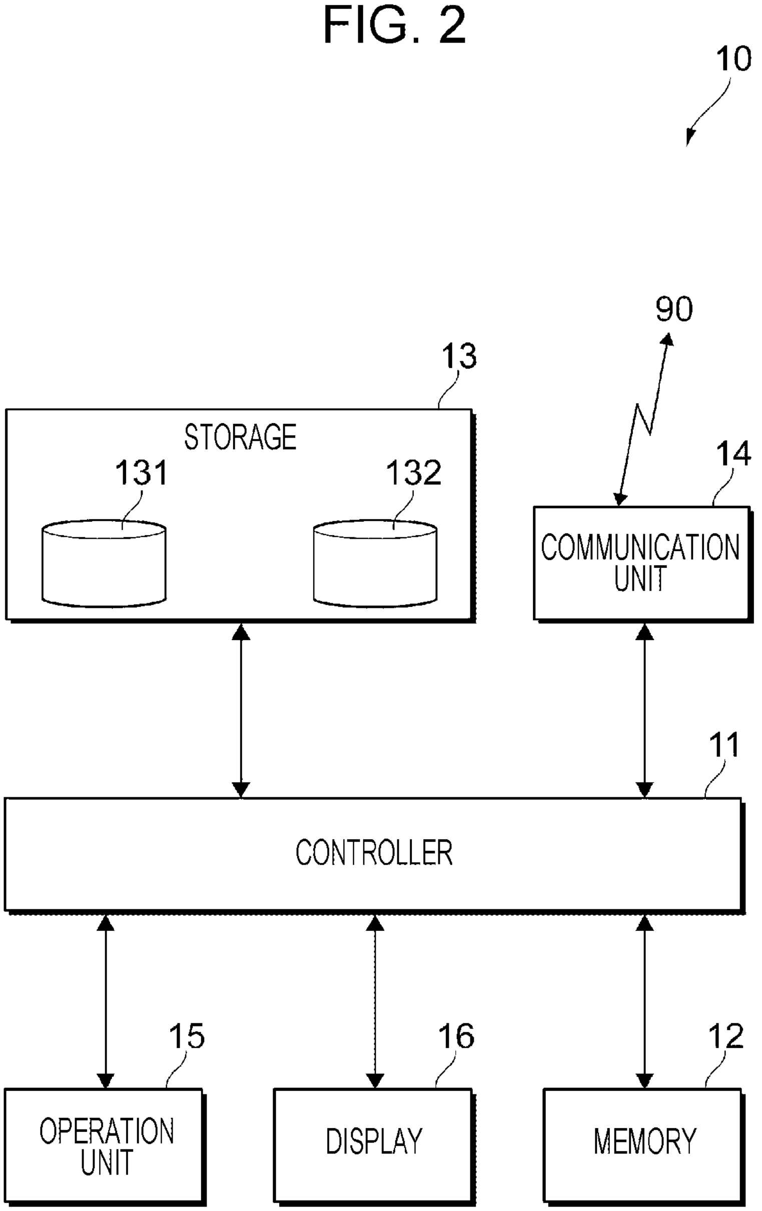
FIG. 2 illustrates an example of a hardware configuration of a management server.

FIG. 2 illustrates an example of a hardware configuration of the management server 10.

The management server 10 includes a controller 11, a memory 12, a storage 13, a communication unit 14, an operation unit 15, and a display 16. These units are connected to one another via a data bus, an address bus, a peripheral component interconnect (PCI) bus, or the like.

The controller 11 is a processor that controls the functions of the management server 10 through the execution of various kinds of software such as an operating system (OS, basic software) or application software. The controller 11 is constituted by, for example, a central processing unit (CPU). The memory 12 is a memory region that stores various kinds of software, data to be used for executing the software, and the like, and is used as a work area at the time of operation. The memory 12 is constituted by, for example, a random access memory (RAM) or the like.

The storage 13 is a memory region that stores data to be input to various kinds of software, data to be output from various kinds of software, and the like. The storage 13 is constituted by, for example, a hard disk drive (HDD), a solid state drive (SSD), a semiconductor memory, or the like to be used to store programs and various kinds of setting data, for example. The storage 13 stores, as databases that store various kinds of information, for example, a document DB 131 in which the document data is stored, an imposition DB 132 in which the imposition information is stored, and the like.

The communication unit 14 transmits/receives data to/from the manager terminal 30, the image forming apparatus 50, and an external apparatus via the network 90. The operation unit 15 is constituted by, for example, a keyboard, a mouse, a mechanical button, and a switch, and receives input operations. The operation unit 15 includes a touch sensor that constitutes a touch panel integrally with the display 16. The display 16 is constituted by, for example, a liquid crystal display or an organic electroluminescent (EL) display used to display information, and displays image data, text data, or the like.

Hardware Configuration of Manager Terminal

The manager terminal 30 has substantially the same configuration as the hardware configuration of the management server 10 illustrated in FIG. 2. That is, the manager terminal 30 includes a controller, a memory, a storage, a communication unit, an operation unit, and a display having substantially the same functions as those of the controller 11, the memory 12, the storage 13, the communication unit 14, the operation unit 15, and the display 16 illustrated in FIG. 2, respectively, and the illustration and description are omitted.

Hardware Configuration of Image Forming Apparatus

Figure 3:
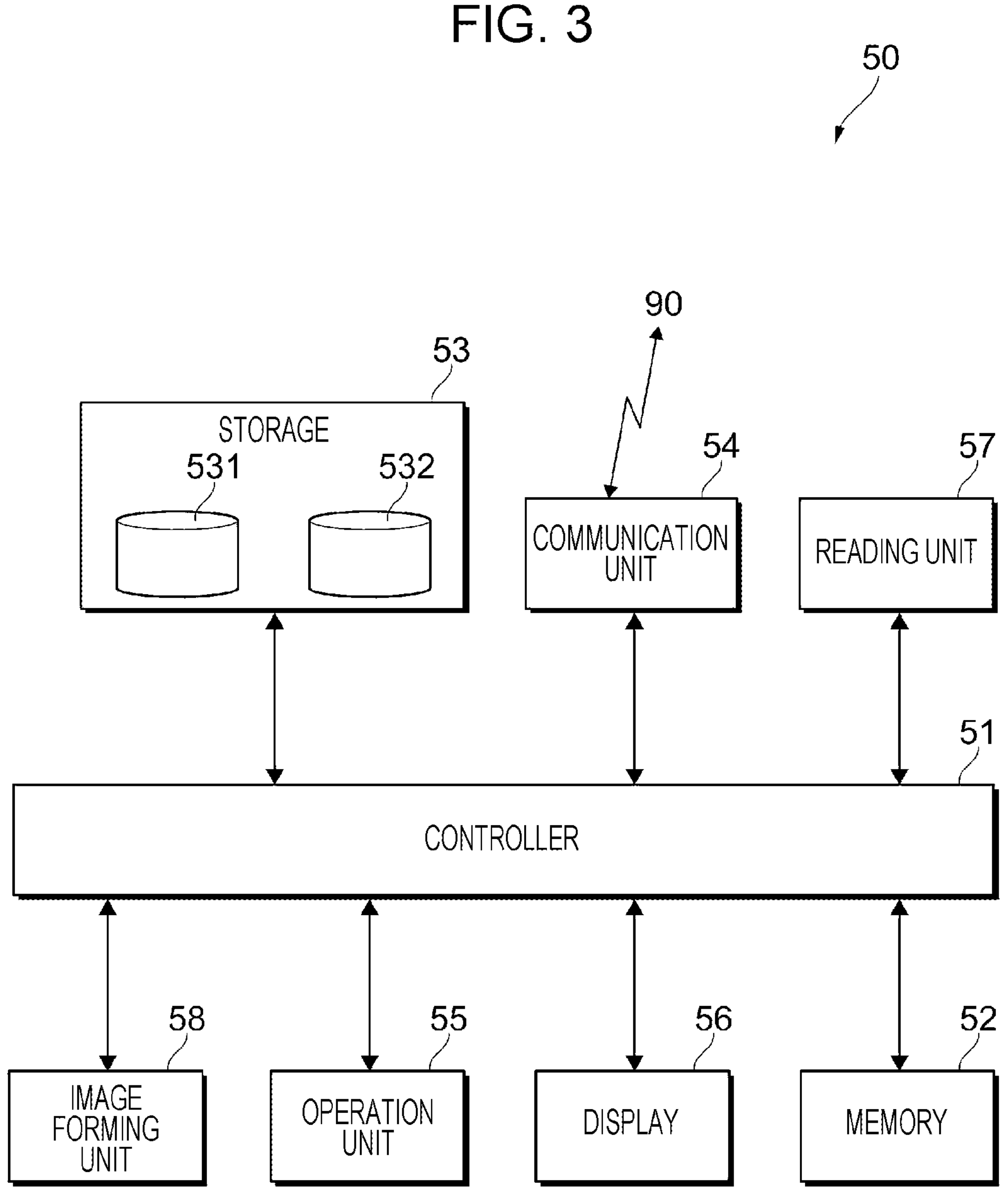
FIG. 3 illustrates an example of a hardware configuration of an image forming apparatus.

FIG. 3 illustrates an example of a hardware configuration of the image forming apparatus 50.

The image forming apparatus 50 includes hardware components corresponding to the controller 11, the memory 12, the storage 13, the communication unit 14, the operation unit 15, and the display 16 among the hardware components of the management server 10 illustrated in FIG. 2.

That is, the image forming apparatus 50 includes a controller 51 constituted by a processor such as a CPU, a memory 52 constituted by a memory region such as a RAM, and a storage 53 constituted by a memory region such as an HDD, an SSD, or a semiconductor memory. The storage 53 stores, as databases that store various kinds of information, for example, a document DB 531 in which the document data is stored, an imposition DB 532 in which the imposition information is stored, and the like. The image forming apparatus 50 also includes a communication unit 54 that transmits/receives data to/from the management server 10, the manager terminal 30, and an external apparatus via the network 90. The image forming apparatus 50 further includes an operation unit 55 constituted by a touch panel or the like, and a display 56 constituted by a liquid crystal display, an organic EL display, or the like.

In addition to the above components, the image forming apparatus 50 further includes a reading unit 57 and an image forming unit 58. The reading unit 57 reads an image recorded on a medium (e.g., paper document) such as a sheet as a recording medium. The reading unit 57 is constituted by, for example, a charge coupled device (CCD) scanner, a contact image sensor (CIS) scanner, or the like. In the CCD scanner, CCDs receive light that is radiated from a light source and reflected on a document and is reduced by a lens. In the CIS scanner, the CIS receives kinds of light sequentially radiated from a light emitting diode (LED) light source and reflected on a document. The image forming unit 58 forms, on a printing surface of a sheet as a recording medium, images based on multiple pieces of image data included in the document data by, for example, the electrophotographic system, the inkjet system, or the like. These units are connected to one another via a data bus, an address bus, a PCI bus, or the like.

Functional Configuration of Controller of Management Server

Figure 4:
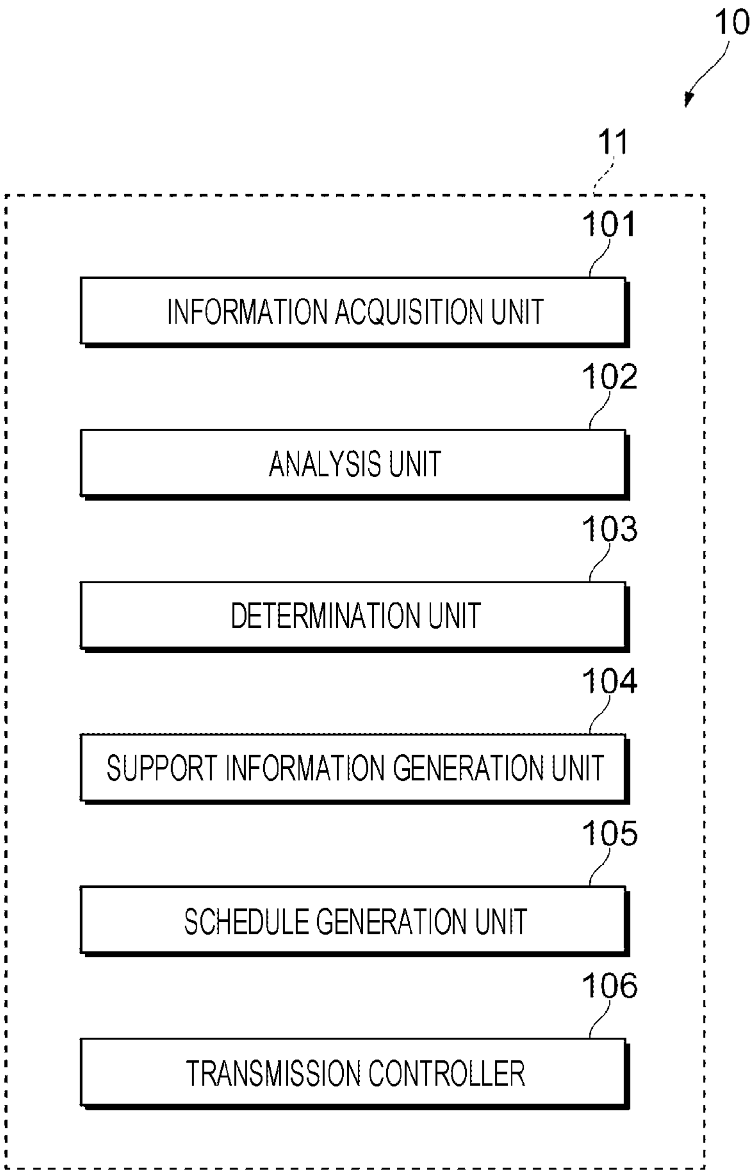
FIG. 4 illustrates an example of a functional configuration of a controller of the management server.

FIG. 4 illustrates an example of a functional configuration of the controller 11 of the management server 10.

In the controller 11 of the management server 10, an information acquisition unit 101, an analysis unit 102, a determination unit 103, a support information generation unit 104, a schedule generation unit 105, and a transmission controller 106 carry out the respective functions.

The information acquisition unit 101 acquires various kinds of information. Specifically, the information acquisition unit 101 acquires information transmitted from each of the manager terminal 30, the image forming apparatus 50, and an external apparatus. Among the kinds of information acquired by the information acquisition unit 101, examples of information transmitted from the manager terminal 30 include the document data, the imposition information, instruction information for generating a printing schedule (hereinafter referred to as "schedule generation instruction information"), instruction information for starting printing (hereinafter referred to as "printing instruction information"), and the like. Examples of the "imposition information" include information indicating a manner to fold and stack printed sheets (hereinafter referred to as "signature information"), information indicating a number p (p is an integer value of 2 or more) and an order of pieces of image data to be arranged on each page (hereinafter referred to as "arrangement information"), and the like.

Among the kinds of information acquired by the information acquisition unit 101, examples of information transmitted from the image forming apparatus 50 include information about image data that has not been received (hereinafter referred to as "unreceived data information") and the like. Among the kinds of information acquired by the information acquisition unit 101, the document data is stored and managed in the document DB 131, and the imposition information is stored and managed in the imposition DB 132.

The analysis unit 102 analyzes the document data acquired by the information acquisition unit 101, and acquires, from the analysis results, various kinds of information. For example, from the analysis results of the document data, the analysis unit 102 acquires the value of a number m (m is an integer value of 2 or more) of the multiple pieces of image data constituting the document data, and identification numbers for identifying the respective m pieces of image data. Note that the identification numbers are assigned in the order of "1", "2", "3", . . . , "m", and the pieces of image data are arranged such that the images may be viewed in this order after bookbinding.

Before completion of receipt by the image forming apparatus 50 of all the pieces of image data constituting the document data, the determination unit 103 determines whether there is any page for which early printing is ready. Specifically, based on the value of the number m obtained from the results of analysis by the analysis unit 102, the identification numbers for identifying the respective m pieces of image data, and the unreceived data information acquired by the information acquisition unit 101, the determination unit 103 specifies identification numbers of pieces of image data that have been received by the image forming apparatus 50. Based on the identification numbers of pieces of image data, which have been received by the image forming apparatus 50, and the signature information and the arrangement information, which are included in the imposition information acquired by the information acquisition unit 101, the determination unit 103 determines whether there is any page for which early printing is ready.

As an example, the manner to fold and stack the printed sheets according to the signature information included in the imposition information is a manner to fold the sheets f times (f is an integer value of 1 or more) and then sequentially stack the sheets without being spread (hereinafter referred to as "perfect binding or side-stitch binding"). In this case, based on the value of the number p indicating the number of pieces of image data to be arranged on each page, the determination unit 103 specifies a range of identification numbers of pieces of image data for which printing is ready.

Specifically, if 1 to (p×2×n) (n is an integer value of 1 or more) are included in the identification numbers of pieces of image data that have been received by the image forming apparatus 50, the determination unit 103 specifies, as the range of identification numbers of pieces of image data for which printing is ready, 1 to (p×2×n) among the identification numbers of pieces of image data that have been received. In this case, "p×2" is the number of pieces of image data to be arranged on each sheet (front side and back side), and "n" is the number of sheets to be printed. Based on the specified range of identification numbers, the determination unit 103 determines whether there is any page for which early printing is ready. Note that a specific example in which printed sheets are folded and stacked in a manner of perfect binding or side-stitch binding will be described later with reference to FIGS. 11A to 11C.

As another example, if the manner to fold and stack the printed sheets according to the signature information included in the imposition information is a manner to fold the sheets f times and then sequentially stack the sheets in a spread state, restored to a state of being folded (f−1) times (hereinafter referred to as "saddle-stitch binding"). In this case, based on the value of the number m indicating the number of the multiple pieces of image data constituting the document data and the value of the number p indicating the number of pieces of image data to be arranged on each page, the determination unit 103 specifies the range of identification numbers of pieces of image data for which printing is ready.

Specifically, if 1 to (m÷2+p) are included in the identification numbers of pieces of image data that have been received by the image forming apparatus 50, the determination unit 103 specifies, as the range of identification numbers of pieces of image data for which printing is ready, (m÷2+p)−(p×2−1) to (m÷2+p) among the identification numbers of pieces of image data that have been received. Based on the specified range of identification numbers, the determination unit 103 determines whether there is any page for which early printing is ready.

That is, in the case of saddle-stitch binding, upon receipt of pieces of image data to be arranged on the final block, early printing is ready. Thus, in a case where receipt starts from a piece of image data with the identification number "1", upon receipt of a piece of image data with an identification number that is the value calculated by "half of the number (m) of all the pieces of image data constituting the document data (m÷2)"+"the number (p) of pieces of image data to be arranged on a half of the block (1 page)", early printing of the final block is ready. Note that a specific example in which the printed sheets are folded and stacked in a manner of saddle-stitch binding will be described later with reference to FIGS. 12A to 12D.

The support information generation unit 104 generates information for supporting a user who performs an operation for printing the document data (hereinafter referred to as "support information"). Examples of the support information include information including the range of identification numbers of pieces of image data for which early printing is ready, information indicating that the printing is ready if the imposition information is changed, and information indicating the range of identification numbers of pieces of image data for which printing is ready if the imposition information is changed. In addition, the support information may also include a ratio of the number of pieces of image data for which printing is ready if the imposition information is changed, with respect to the value m indicating the number of the multiple pieces of image data constituting the document data (e.g., "20%"). Note that a specific example of the support information generated by the support information generation unit 104 will be described later with reference to FIG. 13.

Upon the information acquisition unit 101 acquiring the schedule generation instruction information, the schedule generation unit 105 generates printing schedules of the multiple pieces of image data constituting the document data. Examples of the printing schedules generated by the schedule generation unit 105 include a first printing schedule, a second printing schedule, and a third printing schedule.

Among the printing schedules generated by the schedule generation unit 105, "first printing schedule" refers to a schedule of early printing of one or more pages among the multiple pieces of image data constituting the document data. In addition, "second printing schedule" refers to a schedule of printing of a page on which pieces of image data yet to be received by the image forming apparatus 50 at a time of determination to start printing are to be arranged. The second printing schedule is generated together with the first printing schedule or at another time. In addition, "third printing schedule" refers to a printing schedule generated regardless of the presence or absence of a page for which early printing is ready, the presence or absence of receipt by the image forming apparatus 50 at the time of determination to start printing, or the like. Note that specific examples of the printing schedules generated by the schedule generation unit 105 will be described later with reference to FIGS. 14 and 15.

The transmission controller 106 controls transmission of various kinds of information. Specifically, the transmission controller 106 controls transmission of various kinds of information to each of the manager terminal 30, the image forming apparatus 50, and an external apparatus. Among the kinds of information transmitted under control of the transmission controller 106, examples of information transmitted to the manager terminal 30 include the halfway printing ready information, the support information, the first printing schedule, the second printing schedule, and the like. In addition, among the kinds of information transmitted under control of the transmission controller 106, examples of information transmitted to the image forming apparatus 50 include the image data, the imposition information, the printing instruction information, and the like.

Functional Configuration of Controller of Manager Terminal

Figure 5:
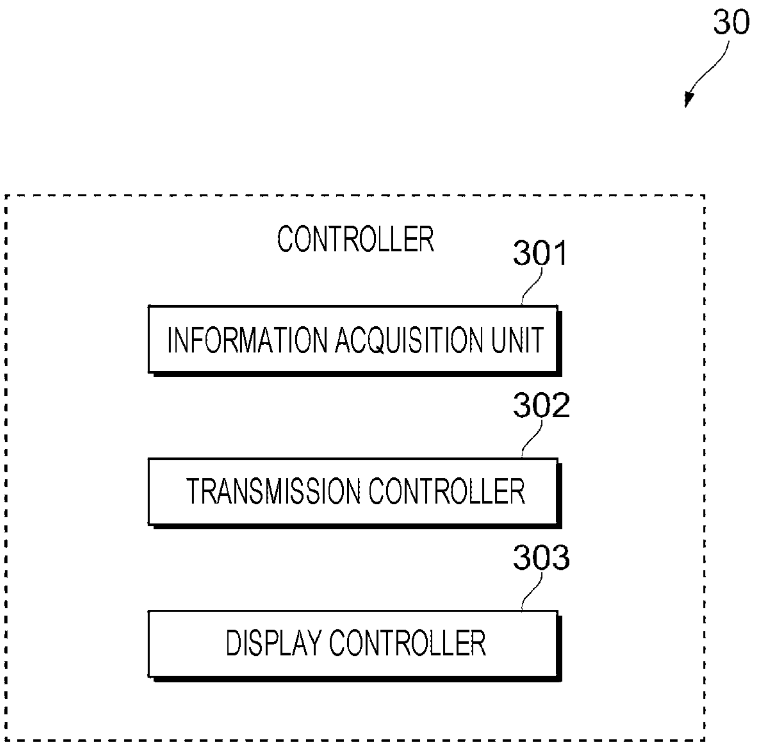
FIG. 5 illustrates an example of a functional configuration of a controller of the manager terminal.

FIG. 5 illustrates an example of a functional configuration of the controller of the manager terminal 30.

In the controller of the manager terminal 30, an information acquisition unit 301, a transmission controller 302, and a display controller 303 carry out the respective functions.

The information acquisition unit 301 acquires various kinds of information. Specifically, the information acquisition unit 301 acquires information transmitted from the management server 10 and an external apparatus. Among the kinds of information acquired by the information acquisition unit 301, examples of information transmitted from the management server 10 include the halfway printing ready information, the support information, the first printing schedule, the second printing schedule, and the like. The information acquisition unit 301 also acquires information input via the operation unit. Examples of the information input via the operation unit include the schedule generation instruction information, the printing instruction information, and the like.

The transmission controller 302 controls transmission of various kinds of information. Specifically, the transmission controller 302 controls transmission of various kinds of information to the management server 10 and an external apparatus. Among the kinds of information transmitted under control of the transmission controller 302, examples of information transmitted to the management server 10 include the document data, the imposition information, the information input via the operation unit, and the like.

The display controller 303 controls the display to display various kinds of information. Specifically, for example, the display controller 303 generates a user interface for displaying various kinds of information on the display, and controls the display to display the generated user interface. On the generated user interface, for example, the halfway printing ready information, the support information, the first printing schedule, the second printing schedule, or the like is displayed. Note that a specific example of information displayed on the user interface will be described later with reference to FIG. 13.

Functional Configuration of Controller of Image Forming Apparatus

Figure 6:
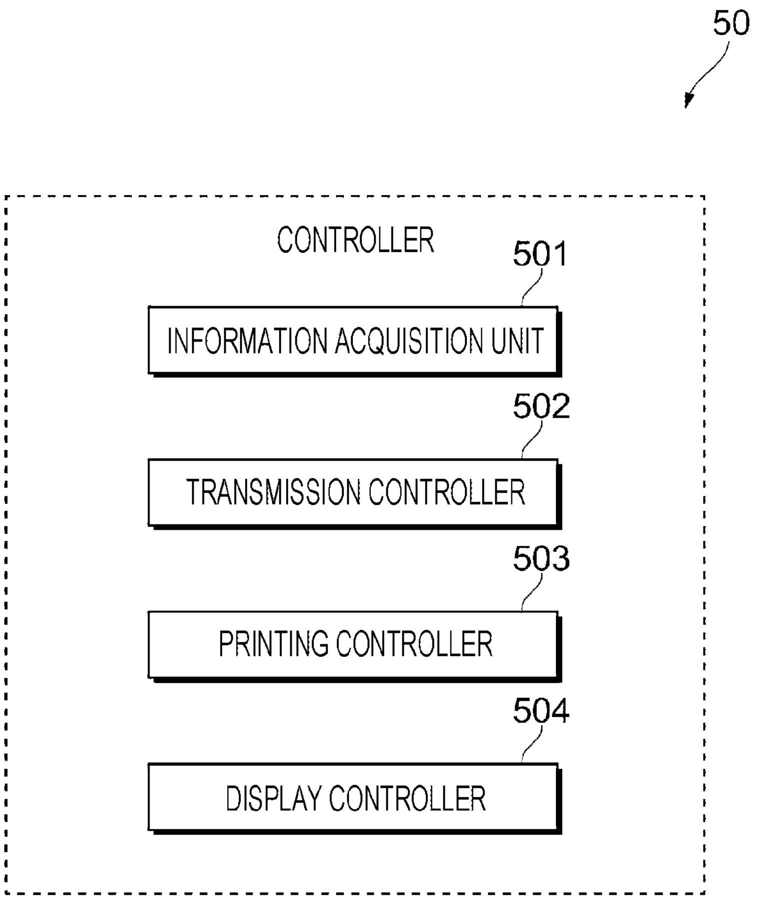
FIG. 6 illustrates an example of a functional configuration of a controller of the image forming apparatus.

FIG. 6 illustrates an example of a functional configuration of the controller 51 of the image forming apparatus 50.

In the controller 51 of the image forming apparatus 50, an information acquisition unit 501, a transmission controller 502, a printing controller 503, and a display controller 504 carry out the respective functions.

The information acquisition unit 501 acquires various kinds of information. Specifically, the information acquisition unit 501 acquires information transmitted from the management server 10 and an external apparatus. Among the kinds of information acquired by the information acquisition unit 501, examples of information transmitted from the management server 10 include the document data, the imposition information, the printing instruction information, the first printing schedule, the second printing schedule, and the like.

The transmission controller 502 controls transmission of various kinds of information. Specifically, the transmission controller 502 controls transmission of various kinds of information to the management server 10 and an external apparatus. Among the kinds of information transmitted under control of the transmission controller 502, examples of information transmitted to the management server 10 include the unreceived data information transmitted if there is a piece of image data yet to be received by the image forming apparatus 50 among the multiple pieces of image data constituting the document data, which is a printing target, and the like.

The printing controller 503 determines, based on the printing instruction information transmitted from the management server 10, to start printing of some or all of the multiple pieces of image data constituting the document data, and controls the image forming unit 58 (see FIG. 3) to start printing.

The display controller 504 controls the display 56 to display various kinds of information. Specifically, for example, the display controller 504 controls the display 56 to display a user interface. On the user interface, for example, the first printing schedule, the second printing schedule, or the like is displayed. Note that a specific example of information displayed on the user interface will be described later with reference to FIG. 15.

Process Flow of Management Server

Figure 7:
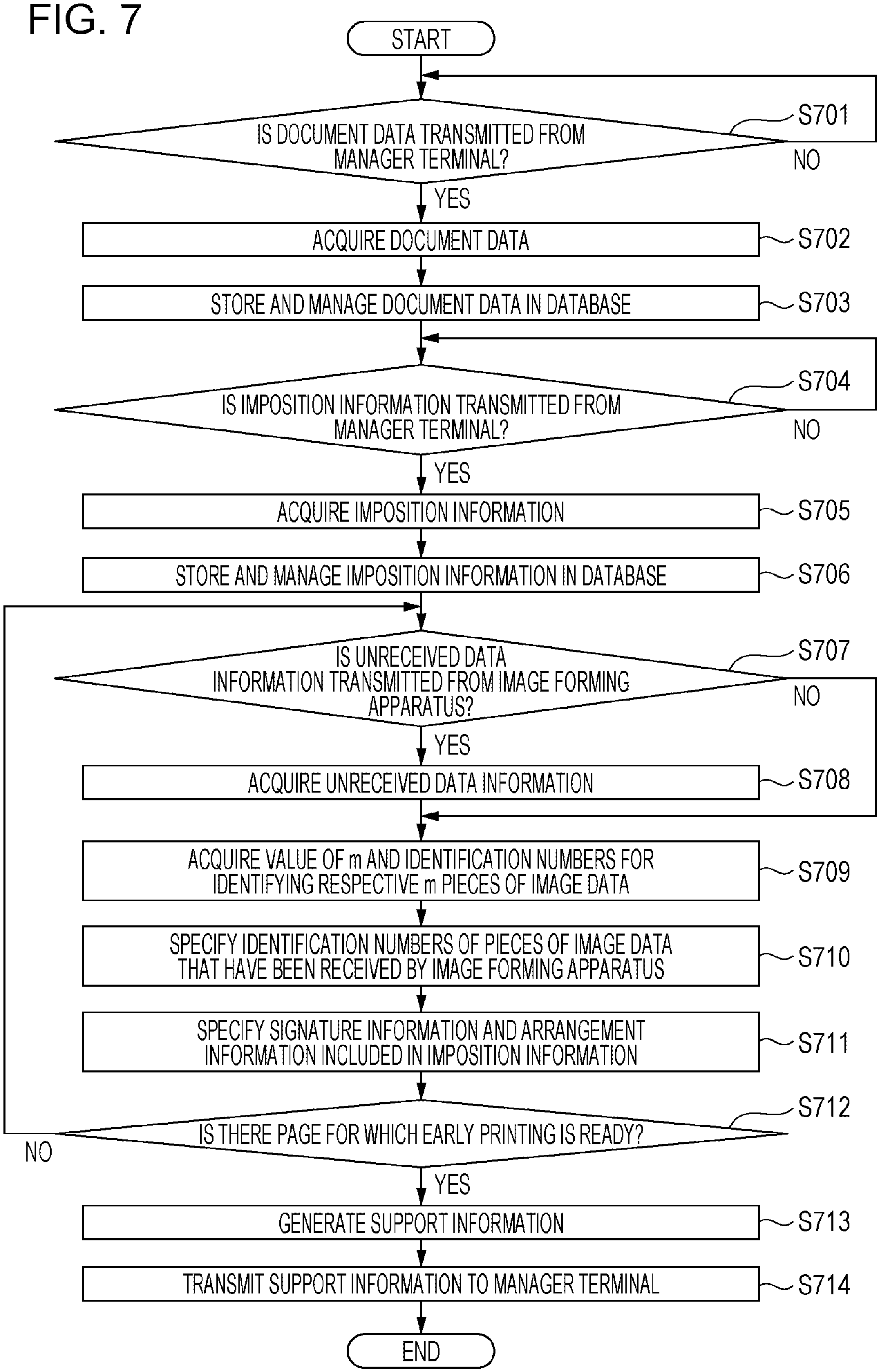
FIG. 7 is a flowchart illustrating an example of a process flow in which support information is transmitted to the manager terminal in a process performed by the management server.

FIGS. 7 and 8 illustrate flowcharts illustrating an example of a process flow of the management server 10.

FIG. 7 is a flowchart illustrating an example of a process flow in which the support information is transmitted to the manager terminal 30 in a process performed by the management server 10.

Upon the document data being transmitted from the manager terminal 30 (YES in step S701), the management server 10 acquires the transmitted document data (step S702), and stores and manages the document data in the document DB 131 (step S703). On the other hand, if the document data is not transmitted (NO in step S701), the management server 10 repeats step S701 until the document data is transmitted.

Upon the imposition information being transmitted from the manager terminal 30 (YES in step S704), the management server 10 acquires the transmitted imposition information (step S705), and stores and manages the imposition information in the imposition DB 132 (step S706). On the other hand, if the imposition information is not transmitted (NO in step S704), the management server 10 repeats step S704 until the imposition information is transmitted.

Upon the unreceived data information being transmitted from the image forming apparatus 50 (YES in step S707), the management server 10 acquires the transmitted unreceived data information (step S708). On the other hand, if the unreceived data information is not transmitted (NO in step S707), the process performed by the management server 10 proceeds to step S709.

From analysis results of the document data acquired in step S702, the management server 10 acquires the value of m and the identification numbers for identifying the respective m pieces of image data (step S709). Then, based on the value of m, the identification numbers for identifying the respective m pieces of image data, and the unreceived data information acquired in step S708, the management server 10 specifies identification numbers of pieces of image data that have been received by the image forming apparatus 50 (step S710).

Subsequently, the management server 10 specifies the signature information and the arrangement information included in the imposition information acquired in step S705 (step S711). Then, as a result of determination based on the identification numbers of pieces of image data that have been received by the image forming apparatus 50, the signature information, and the arrangement information, if there is any page for which early printing is ready (YES in step S712), the management server 10 generates the support information (step S713), and transmits the support information to the manager terminal 30 (step S714). On the other hand, if there is no page for which early printing is ready (NO in step S712), the process performed by the management server 10 returns to step S707.

FIG. 8 is a flowchart illustrating an example of a process flow performed after the support information is transmitted to the manager terminal 30 in the process performed by the management server 10.

Upon the schedule generation instruction information being transmitted from the manager terminal 30 (YES in step S801), the management server 10 acquires the schedule generation instruction information (step S802). Then, the management server 10 generates the first printing schedule and the second printing schedule (step S803), and transmits the generated first printing schedule and the generated second printing schedule to the manager terminal 30 (step S804). On the other hand, if the schedule generation instruction information is not transmitted (NO in step S801), the management server 10 repeats step S801 until the schedule generation instruction information is transmitted.

Subsequently, if the printing instruction information is transmitted from the manager terminal 30 (YES in step S805), the management server 10 acquires the printing instruction information (step S806). Then, the management server 10 transmits the acquired printing instruction information to the image forming apparatus 50 (step S807). Thus, the process performed by the management server 10 ends (END), and the image forming apparatus 50 starts printing. On the other hand, if the printing instruction information is not transmitted (NO in step S805), the management server 10 repeats step S805 until the printing instruction information is transmitted.

Process Flow of Manager Terminal

Figure 9:
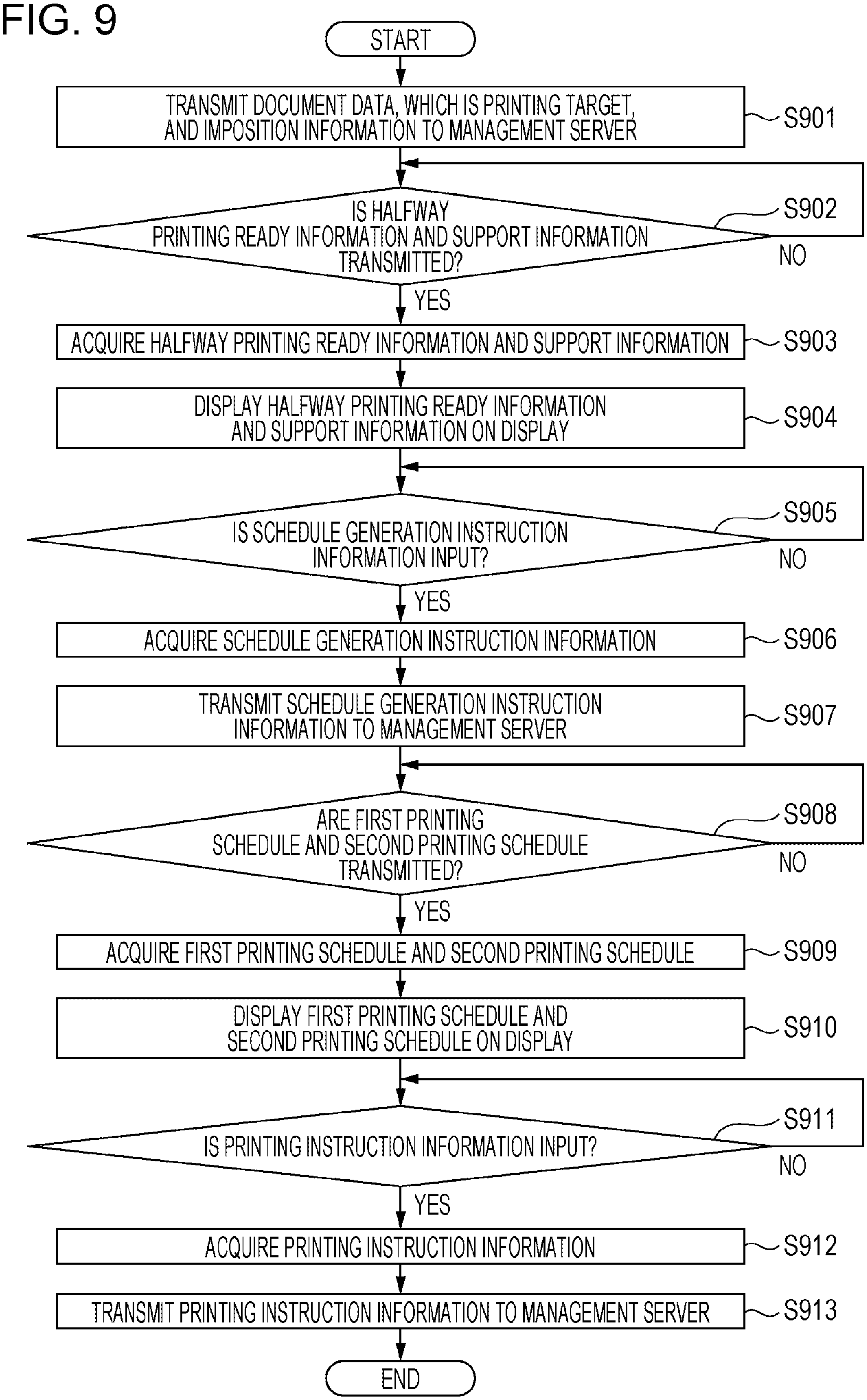
FIG. 9 is a flowchart illustrating an example of a process flow of the manager terminal.

FIG. 9 is a flowchart illustrating an example of a process flow of the manager terminal 30.

The manager terminal 30 transmits the document data, which is a printing target, and the imposition information to the management server 10 (step S901). Upon the halfway printing ready information and the support information being transmitted from the management server 10 (YES in step S902), the manager terminal 30 acquires the transmitted halfway printing ready information and the transmitted support information (step S903), and displays the acquired halfway printing ready information and the acquired support information on the display 56 (see FIG. 3) (step S904). On the other hand, if the halfway printing ready information and the support information are not transmitted (NO in step S902), the manager terminal 30 repeats step S902 until the halfway printing ready information and the support information are transmitted.

Upon the schedule generation instruction information being input via the operation unit 55 (see FIG. 3) (YES in step S905), the manager terminal 30 acquires the input schedule generation instruction information (step S906), and transmits the acquired schedule generation instruction information to the management server 10 (step S907). On the other hand, if the schedule generation instruction information is not input (NO in step S905), the manager terminal 30 repeats step S905 until the schedule generation instruction information is input.

Subsequently, upon the first printing schedule and the second printing schedule being transmitted from the management server 10 (YES in step S908), the manager terminal 30 acquires the transmitted first printing schedule and the transmitted second printing schedule (step S909) and displays the acquired first printing schedule and the acquired second printing schedule on the display 56 (step S910). On the other hand, if the first printing schedule and the second printing schedule are not transmitted (NO in step S908), the manager terminal 30 repeats step S908 until the first printing schedule and the second printing schedule are transmitted.

Subsequently, upon the printing instruction information being input via the operation unit 55 (YES in step S911), the manager terminal 30 acquires the input printing instruction information (step S912), and transmits the acquired printing instruction information to the management server 10 (step S913). Thus, the process performed by the manager terminal 30 ends (END), and the image forming apparatus 50 starts printing. On the other hand, if the printing instruction information is not input (NO in step S911), the manager terminal 30 repeats step S911 until the printing instruction information is input.

Process Flow of Image Forming Apparatus

Figure 10:
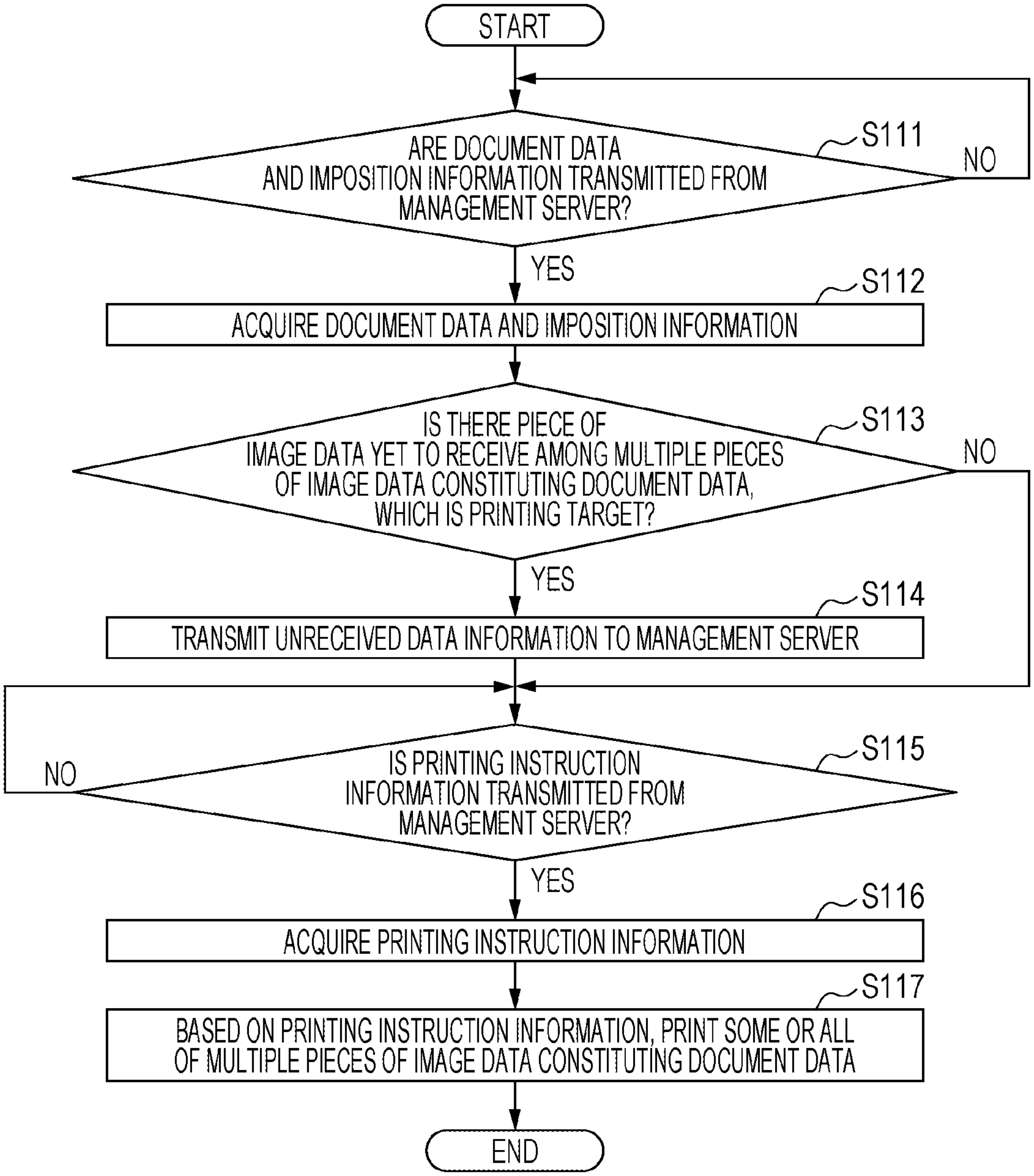
FIG. 10 is a flowchart illustrating an example of a process flow of the image forming apparatus.

FIG. 10 is a flowchart illustrating an example of a process flow of the image forming apparatus 50.

Upon the document data and the imposition information being transmitted from the management server 10 (YES in step S111), the image forming apparatus 50 acquires the transmitted document data and the transmitted imposition information (step S112). On the other hand, if the document data and the imposition information are not transmitted (NO in step S111), the image forming apparatus 50 repeats step S111 until the document data and the imposition information are transmitted.

If there is a piece of image data yet to receive among the multiple pieces of image data constituting the document data, which is a printing target (YES in step S113), the image forming apparatus 50 transmits the unreceived data information to the management server 10 (step S114), and proceeds to step S115. On the other hand, if the image forming apparatus 50 has received all of the multiple pieces of image data constituting the document data, which is a printing target (NO in step S113), the image forming apparatus 50 proceeds to step S115 without transmitting the unreceived data information.

Upon the printing instruction information being transmitted from the management server 10 (YES in step S115), the image forming apparatus 50 acquires the transmitted printing instruction information (step S116). Then, based on the acquired printing instruction information, the image forming apparatus 50 prints some or all of the multiple pieces of image data constituting the document data (step S117). Thus, the process performed by the image forming apparatus 50 ends (END). On the other hand, if the printing instruction information is not transmitted (NO in step S115), the image forming apparatus 50 repeats step S115 until the printing instruction information is transmitted.

Specific Examples

Figure 11A:
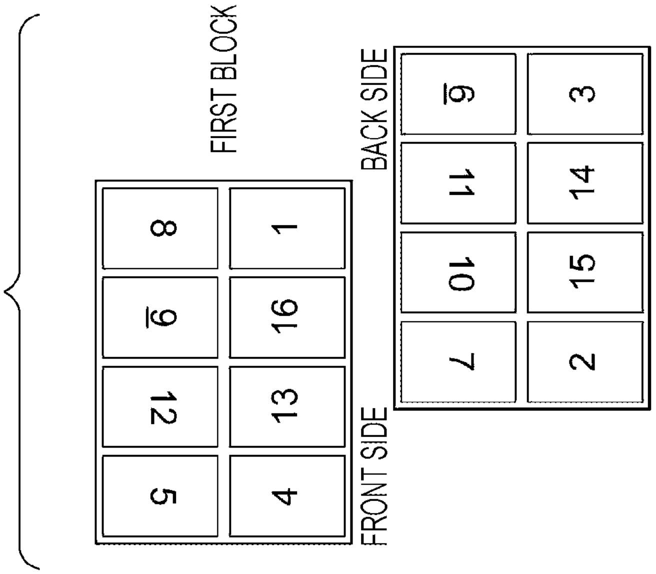
FIG. 11A illustrates a specific example of a "first block" in a case where printed sheets are folded and stacked in a manner of perfect binding or side-stitch binding.
Figure 11B:
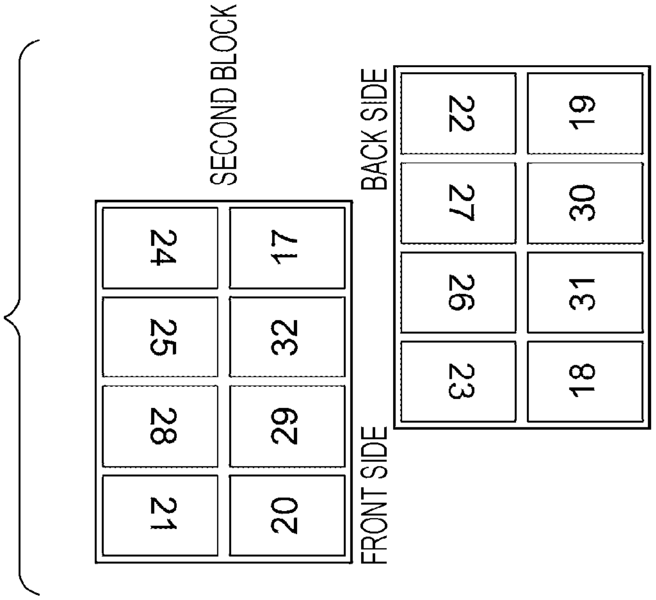
FIG. 11B illustrates a specific example of a "second block" in a case where the printed sheets are folded and stacked in a manner of perfect binding or side-stitch binding.
Figure 11C:
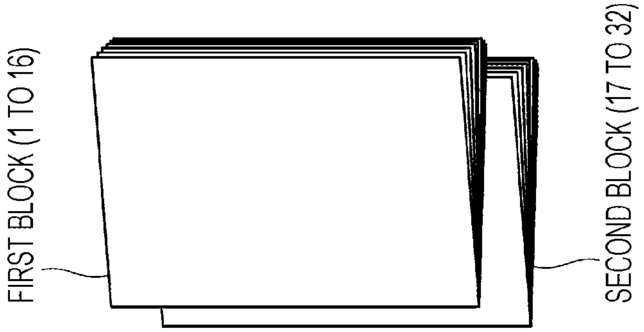
FIG. 11C illustrates a specific example of a state in which the "first block" and the "second block", which are folded for bookbinding, are stacked.

FIGS. 11A to 11C illustrate a specific example in which the printed sheets are folded and stacked in a manner of perfect binding or side-stitch binding.

FIG. 11A illustrates a specific example of a "first block" in a case where the printed sheets are folded and stacked in a manner of perfect binding or side-stitch binding. FIG. 11B illustrates a specific example of a "second block" in a case where the printed sheets are folded and stacked in a manner of perfect binding or side-stitch binding. FIG. 11C illustrates a specific example of a state in which the "first block" and the "second block", which are folded for bookbinding, are stacked.

The "first block" in a case where the printed sheets are folded and stacked in a manner of perfect binding or side-stitch binding refers to a block of a sheet in which a printing surface is a page on which a piece of image data corresponding to "1" is to be arranged, among the identification numbers for identifying the respective m pieces of image data constituting the document data. In addition, the "second block" in a case where the printed sheets are folded and stacked in a manner of perfect binding or side-stitch binding refers to a block of a sheet following the "first block".

In the "first block" in the example in FIG. 11A, among the identification numbers "1" to "32" for identifying the respective 32 pieces of image data constituting the document data, pieces of image data corresponding to identification numbers "1" to "16" are arranged. In the "second block" in the example in FIG. 11B, among the identification numbers "1" to "32" for identifying the respective 32 pieces of image data constituting the document data, pieces of image data corresponding to identification numbers "17" to "32" are arranged.

In the example in FIGS. 11A to 11C, 16 pieces of image data in total are arranged per sheet. Thus, if the respective pieces of image data corresponding to the identification numbers "1" to "16" have been received by the image forming apparatus 50, even at a stage where pieces of image data corresponding to the identification number "17" and the following identification numbers are yet to be received, it is determined that early printing of the "first block" is ready.

FIGS. 12A to 12D illustrate a specific example in which the printed sheets are folded and stacked in a manner of saddle-stitch binding.

Figures 12A, 12B, 12C, 12D:
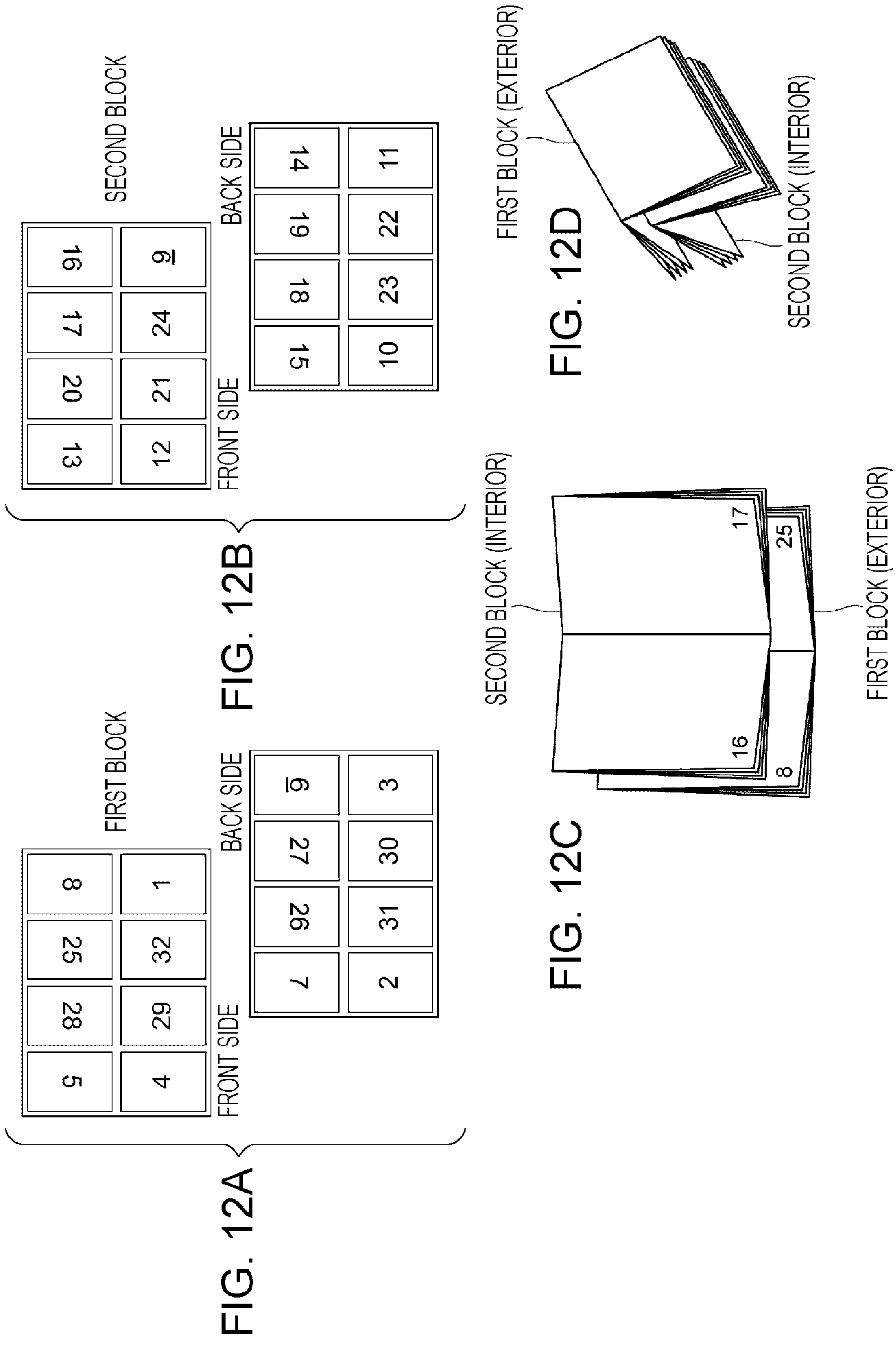
FIG. 12A illustrates a specific example of a "first block" in a case where the printed sheets are folded and stacked in a manner of saddle-stitch binding.
FIG. 12B illustrates a specific example of a "second block" in a case where the printed sheets are folded and stacked in a manner of saddle-stitch binding.
FIGS. 12C and 12D illustrate a specific example of a state in which the "first block" and the "second block", which are folded for bookbinding, are stacked.

FIG. 12A illustrates a specific example of a "first block" in a case where the printed sheets are folded and stacked in a manner of saddle-stitch binding. FIG. 12B illustrates a specific example of a "second block" in a case where the printed sheets are folded and stacked in a manner of saddle-stitch binding. FIGS. 12C and 12D illustrate a specific example of a state in which the "first block (exterior)" and the "second block (interior)", which are folded for bookbinding, are stacked.

The "first block" in a case where the printed sheets are folded and stacked in a manner of saddle-stitch binding refers to a block of a sheet in which a printing surface is a page on which a piece of image data corresponding to "1" is to be arranged, among the identification numbers for identifying the respective m pieces of image data constituting the document data, as in the case of perfect binding or side-stitch binding. In addition, the "second block" in a case where the printed sheets are folded and stacked in a manner of saddle-stitch binding refers to a block of a sheet stacked in the interior of the "first block" in the spread state.

In the "first block" in the example in FIG. 12A, among the identification numbers "1" to "32" for identifying the respective 32 pieces of image data constituting the document data, pieces of image data corresponding to identification numbers "1" to "8" and "25" to "32" are arranged. In the "second block" in the example in FIG. 12B, among the identification numbers "1" to "32" for identifying the respective 32 pieces of image data constituting the document data, pieces of image data corresponding to identification numbers "9" to "24" are arranged.

In the example of saddle-stitch binding illustrated in FIGS. 12A to 12D, as in the above example of perfect binding or side-stitch binding illustrated in FIGS. 11A to 11C, 16 pieces of image data in total are arranged per sheet. However, in the case of saddle-stitch binding, it is determined whether the image forming apparatus 50 has received pieces of image data in an order from blocks of a deliverable form, and thus, it is determined whether there is any page for which early printing is ready before completion of receipt of all the pieces of image data constituting the document data.

Specifically, in the example illustrated in FIGS. 12A to 12D, if pieces of image data that have been received by the image forming apparatus 50 include pieces of image data with identification numbers "1" to "m÷2+p", the range of identification numbers of pieces of image data for which printing is ready is identification numbers "(m÷2+p)−(p×2−1)" to "(m÷2+p)" corresponding to pieces of image data to be arranged on a final block. That is, since m=32 and p=8, if the pieces of image data that have been received by the image forming apparatus 50 include pieces of image data with identification numbers "1" to "24", even at a stage where pieces of image data corresponding to the identification number "25" and the following identification numbers are yet to be received, it is determined that early printing of the final block is ready.

FIG. 13 illustrates a specific example of the user interface displayed on the display of the manager terminal 30.

As illustrated in FIG. 13, on the user interface displayed on the display of the manager terminal 30, schedules of the respective printing jobs are displayed. Each printing job is associated with the following kinds of information: "order ID", "order number", "order date and time", "sending completion scheduled date and time (earliest)", "halfway printing, "customer name", "sending completion date and time (earliest)", "earliest product sending completion scheduled date and time (earliest)", "product branch number", "product ID", and "product name".

Among the kinds of information associated with the printing job, the halfway printing ready information and the support information are displayed in "halfway printing". For example, for a printing job with the order ID "100001", as the halfway printing ready information and the support information, a message "up to page XX is printable" is displayed. Here, to issue an instruction for printing up to page XX for the printing job with the order ID "100001", the manager performs an operation of selecting the printing job with the order ID "100001" and an operation of pressing a button B1 denoted as "halfway printing". Although not illustrated, as the halfway printing ready information and the support information, a message "up to block X is printable" or a message "XX % of all is printable", which is an expression other than the page, may be displayed.

Figure 14:
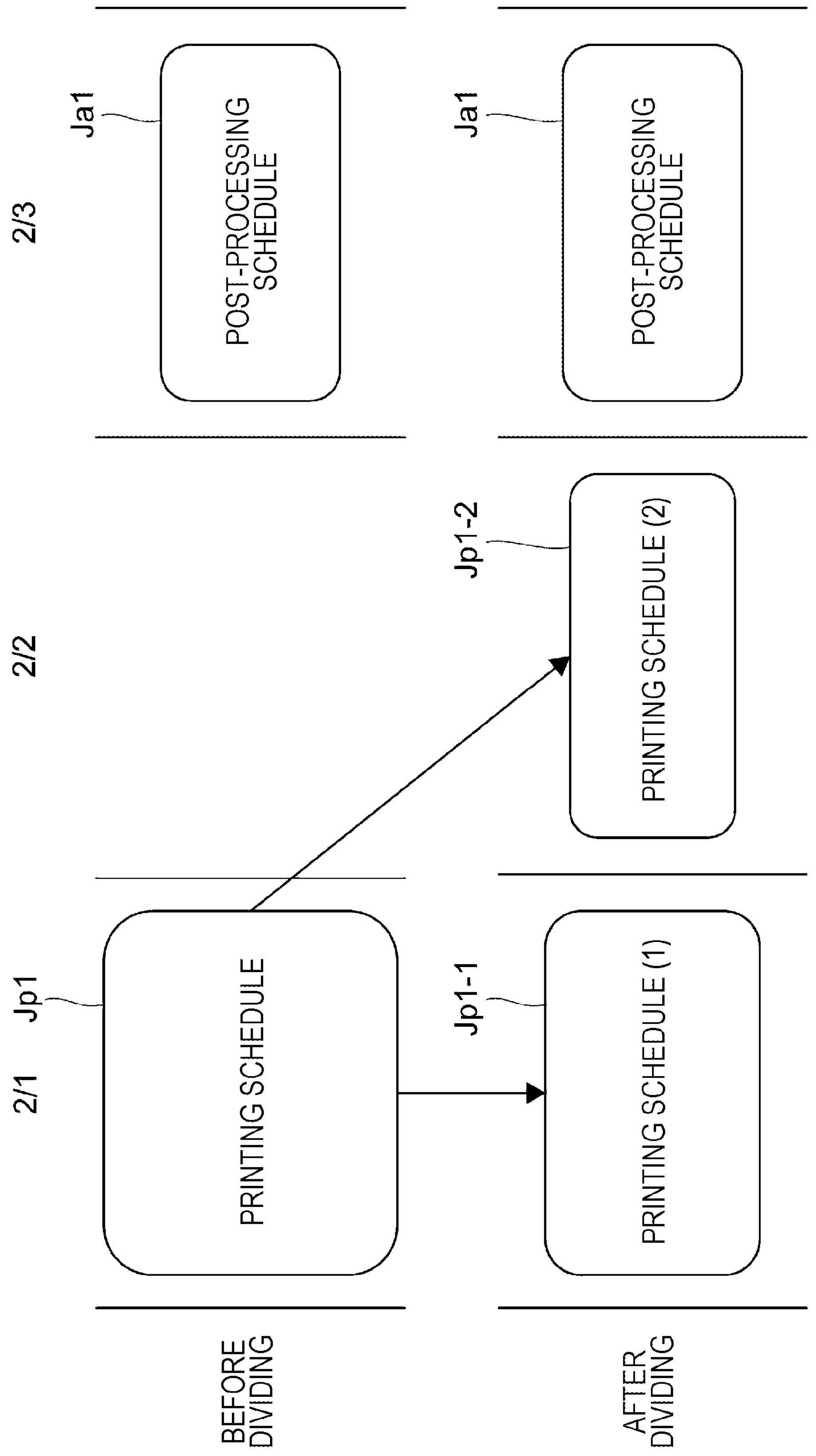
FIG. 14 illustrates a specific example of dividing a printing schedule.

FIG. 14 illustrates a specific example of dividing a printing schedule.

FIG. 14 illustrates a third printing schedule and illustrates a first printing schedule and a second printing schedule generated by dividing the third printing schedule. In the example in FIG. 14, the third printing schedule is generated as a printing schedule "before dividing". That is, the third printing schedule "before dividing" includes a printing job Jp1 (printing schedule) scheduled on February 1 (2/1) and a post-processing job Ja1 (post-processing schedule) (e.g., bookbinding) scheduled on February 3 (2/3).

Here, the printing job Jp1 (printing schedule) scheduled on February 1 (2/1) as the third printing schedule "before dividing" is divided to generate the first printing schedule and the second printing schedule. In this case, the printing schedule "after dividing" includes a printing job Jp1-1 (printing schedule (1)) scheduled on February 1 (2/1) as the first printing schedule, a printing job Jp1-2 (printing schedule (2)) scheduled on February 2 (2/2) as the second printing schedule, and the post-processing job Ja1 (post-processing schedule) (e.g., bookbinding) scheduled on February 3 (2/3) as the third printing schedule.

When the first printing schedule and the second printing schedule are generated, a remaining printing time or the like is calculated, and the schedule is automatically adjusted so as to perform the following work step (e.g., post-processing) in time. In addition, although not illustrated, a message indicating conditions for starting post-processing may be displayed on a user interface. In this case, for example, a message "upon completion of the printing jobs Jp1-1 and Jp1-2, the post-processing job Ja1 is ready" may be displayed. Furthermore, if the printing schedule is divided, for example, by providing a branch number for the above-described "order ID" in FIG. 13, the manager may check and manage the schedules before and after dividing.

FIG. 15 illustrates a specific example of a user interface displayed on the display 56 of the image forming apparatus 50.

As illustrated in FIG. 15, data of the printing job Jp1-1 based on the first schedule and data of the printing job Jp1-2 based on the second schedule are displayed on the user interface. The job printing job Jp1-1 is a printing job for a work of halfway printing, whereas the printing job Jp1-2 is a printing job for a work of printing the rest of the whole. In this case, the printing is executed in the order of the printing job Jp1-1 and the printing job Jp1-2.

Specifically, "waiting" is displayed for the printing job Jp1-1, whereas "not ready" is displayed for the printing job Jp1-2. "Waiting" indicates a state in which halfway printing is ready (that is, printing may start). On the other hand, "not ready" indicates a state in which receipt of image data by the image forming apparatus 50 is incomplete, and printing is not allowed to start. However, the state illustrated in the printing job Jp1-2 is automatically updated in accordance with the status of receipt of image data by the image forming apparatus 50.

Other Exemplary Embodiments

Although the exemplary embodiment has been described above, the present disclosure is not limited to the above exemplary embodiment. In addition, the effects according to the exemplary embodiment of the present disclosure are not limited to those described in the above exemplary embodiment. For example, the configuration of the information processing system 1 illustrated in FIG. 1, the hardware configuration of the management server 10 illustrated in FIG. 2, and the hardware configuration of the image forming apparatus 50 illustrated in FIG. 3 are examples for achieving the object of the present disclosure and are not limited to particular ones. In addition, the functional configuration of the management server 10 illustrated in FIG. 4, the functional configuration of the manager terminal 30 illustrated in FIG. 5, and the functional configuration of the image forming apparatus 50 illustrated in FIG. 6 are also examples and are not limited to particular ones. The information processing system 1 in FIG. 1 may have any functions for implementing the above-described processing as a whole, and functional configurations for implementing the functions are not limited to the examples in FIGS. 4 to 6.

In addition, the order of steps in the process performed by the management server 10 illustrated in FIGS. 7 and 8, the order of steps in the process performed by the manager terminal 30 illustrated in FIG. 9, and the order of steps in the process performed by the image forming apparatus 50 illustrated in FIG. 10 are examples and are not limited to particular ones. The process may be executed chronologically in the illustrated order of steps, or may be executed concurrently or individually, not chronologically. Furthermore, the specific examples illustrated in FIGS. 11 to 15 are also examples and are not limited to particular ones.

For example, in the above exemplary embodiment, when it is determined whether there is any page for which early printing is ready, based on the identification numbers of pieces of image data and the unreceived data information, the identification numbers of pieces of image data that have been received by the image forming apparatus 50 are specified. However, the present disclosure is not limited to this example. For example, based on identification numbers of pieces of image data that have been transmitted from the management server 10, the identification numbers of pieces of image data that have been received by the image forming apparatus 50 may be specified.

Furthermore, cases using "second block" are illustrated as specific examples of folding and stacking sheets illustrated in FIGS. 11 and 12 above. However, the present disclosure is not limited to these examples. For example, "third block", "fourth block", and a block of any greater number may also be used.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing system comprising:

one or more processors configured to:

acquire document data and imposition information, the document data being constituted by a plurality of pieces of image data, the imposition information being information about imposition of the document data; and if pieces of image data, among the plurality of pieces of image data, to be imposed on one or more pages have been received, the one or more pages being included in a plurality of pages that serve as printing surfaces of sheets on which the document data is to be printed based on the imposition information, perform control to notify a user that printing of the one or more pages is ready.

(((2)))

The information processing system according to (((1))), wherein the one or more processors are configured to determine whether to start the printing of the one or more pages, based on an instruction from the user to a notification of support information for supporting printing of the document data.

(((3)))

The information processing system according to (((1))) or (((2))), wherein the one or more processors are configured to, upon determining to start the printing of the one or more pages, generate a first printing schedule and a second printing schedule, the first printing schedule being a schedule of the printing, the second printing schedule being a schedule of printing of a page on which pieces of image data yet to be received at a time of determination to start the printing are to be arranged.

(((4)))

The information processing system according to (((3))), wherein the one or more processors are configured to generate a user interface on which each of the first printing schedule and the second printing schedule is individually displayed.

(((5)))

The information processing system according to any one of (((1))) to (((4))), wherein the one or more processors are configured to acquire, by analyzing the document data, a number m (m is an integer value of 2 or more) of the plurality of pieces of image data, and an identification number of a piece of image data yet to be received among the plurality of pieces of image data, and to acquire, as the imposition information, signature information and arrangement information, the signature information indicating a manner to fold and stack printed sheets, the arrangement information indicating a number p (p is an integer value of 2 or more) and an order of pieces of image data, among the plurality of pieces of image data, to be arranged on each page of the plurality of pages.

(((6)))

The information processing system according to (((5))), wherein the one or more processors are configured to:

based on a value of the number m and the identification number of the piece of image data yet to be received, specify identification numbers of the pieces of image data that have been received; and based on a range of the specified identification numbers of the pieces of image data that have been received, determine whether the printing of the one or more pages is ready.

(((7)))

The information processing system according to (((6))), wherein the one or more processors are configured to, if the manner to fold and stack the printed sheets according to the signature information is a manner to fold the sheets f times (f is an integer value of 1 or more) and then sequentially stack the sheets without being spread, based on a value of the number p, specify a range of identification numbers of pieces of image data for which printing is ready.

(((8)))

The information processing system according to (((7))), wherein the one or more processors are configured to, if 1 to (p×2×n) (n is an integer value of 1 or more) are included in the identification numbers of the pieces of image data that have been received, specify, as the range of identification numbers of pieces of image data for which printing is ready, 1 to (p×2×n) among the identification numbers of the pieces of image data that have been received.

(((9)))

The information processing system according to (((6))), wherein the one or more processors are configured to, if the manner to fold and stack the printed sheets according to the signature information is a manner to fold the sheets f times (f is an integer value of 1 or more) and then sequentially stack the sheets in a spread state, restored to a state of being folded (f−1) times, based on a value of the number m and a value of the number p, specify a range of identification numbers of pieces of image data for which printing is ready.

(((10)))

The information processing system according to (((9))), wherein the one or more processors are configured to, if 1 to (m÷2+p) are included in the identification numbers of the pieces of image data that have been received, specify, as the range of identification numbers of pieces of image data for which printing is ready, (m÷2+p)−(p×2−1) to (m÷2+p) among the identification numbers of the pieces of image data that have been received.

(((11)))

11. The information processing system according to any one of (((7))) to (((10))), wherein the one or more processors are configured to perform control to further notify the user of support information including the range of identification numbers of pieces of image data for which printing is ready.

(((12)))

The information processing system according to (((11))), wherein the one or more processors are configured to perform control to further provide, to the user, as the support information, a notification that the printing is ready if the imposition information is changed.

(((13)))

The information processing system according to (((12))), wherein the one or more processors are configured to perform control to, in addition to providing the notification that the printing is ready if the imposition information is changed, notify the user of the range of identification numbers of pieces of image data for which printing is ready among the pieces of image data that have been received.

(((14)))

A program for causing a computer to implement:

a function of acquiring document data and imposition information, the document data being constituted by a plurality of pieces of image data, the imposition information being information about imposition of the document data; and a function of, if pieces of image data, among the plurality of pieces of image data, to be imposed on one or more pages have been received, the one or more pages being included in a plurality of pages that serve as printing surfaces of sheets on which the document data is to be printed based on the imposition information, performing control to notify a user that printing of the one or more pages is ready.

What is claimed is:

1. An information processing system comprising:

one or more processors configured to:

acquire document data and imposition information, the document data being constituted by a plurality of pieces of image data, the imposition information being information about imposition of the document data; and if pieces of image data, among the plurality of pieces of image data, to be imposed on one or more pages have been received, the one or more pages being included in a plurality of pages that serve as printing surfaces of sheets on which the document data is to be printed based on the imposition information, perform control to notify a user that printing of the one or more pages is ready, wherein the one or more processors are configured to perform control to notify the user that printing of the one or more pages is ready before completion of receipt of all the pieces of image data constituting the document data.

2. The information processing system according to claim 1, wherein the one or more processors are configured to determine whether to start the printing of the one or more pages, based on an instruction from the user to a notification of support information for supporting printing of the document data.

3. The information processing system according to claim 2, wherein the one or more processors are configured to, upon determining to start the printing of the one or more pages, generate a first printing schedule and a second printing schedule, the first printing schedule being a schedule of the printing, the second printing schedule being a schedule of printing of a page on which pieces of image data yet to be received at a time of determination to start the printing are to be arranged.

4. The information processing system according to claim 3, wherein the one or more processors are configured to generate a user interface on which each of the first printing schedule and the second printing schedule is individually displayed.

5. The information processing system according to claim 1, wherein the one or more processors are configured to acquire, by analyzing the document data, a number m (m is an integer value of 2 or more) of the plurality of pieces of image data, and an identification number of a piece of image data yet to be received among the plurality of pieces of image data, and to acquire, as the imposition information, signature information and arrangement information, the signature information indicating a manner to fold and stack printed sheets, the arrangement information indicating a number p (p is an integer value of 2 or more) and an order of pieces of image data, among the plurality of pieces of image data, to be arranged on each page of the plurality of pages.

6. The information processing system according to claim 5, wherein the one or more processors are configured to:

based on a value of the number m and the identification number of the piece of image data yet to be received, specify identification numbers of the pieces of image data that have been received; and based on a range of the specified identification numbers of the pieces of image data that have been received, determine whether the printing of the one or more pages is ready.

7. The information processing system according to claim 6, wherein the one or more processors are configured to, if the manner to fold and stack the printed sheets according to the signature information is a manner to fold the sheets f times (f is an integer value of 1 or more) and then sequentially stack the sheets without being spread, based on a value of the number p, specify a range of identification numbers of pieces of image data for which printing is ready.

8. The information processing system according to claim 7, wherein the one or more processors are configured to, if 1 to (p×2×n) (n is an integer value of 1 or more) are included in the identification numbers of the pieces of image data that have been received, specify, as the range of identification numbers of pieces of image data for which printing is ready, 1 to (p×2×n) among the identification numbers of the pieces of image data that have been received.

9. The information processing system according to claim 6, wherein the one or more processors are configured to, if the manner to fold and stack the printed sheets according to the signature information is a manner to fold the sheets f times (f is an integer value of 1 or more) and then sequentially stack the sheets in a spread state, restored to a state of being folded (f−1) times, based on a value of the number m and a value of the number p, specify a range of identification numbers of pieces of image data for which printing is ready.

10. The information processing system according to claim 9, wherein the one or more processors are configured to, if 1 to (m÷2+p) are included in the identification numbers of the pieces of image data that have been received, specify, as the range of identification numbers of pieces of image data for which printing is ready, (m÷2+p)−(p×2−1) to (m÷2+p) among the identification numbers of the pieces of image data that have been received.

11. The information processing system according to claim 10, wherein the one or more processors are configured to perform control to further notify the user of support information including the range of identification numbers of pieces of image data for which printing is ready.

12. The information processing system according to claim 11, wherein the one or more processors are configured to perform control to further provide, to the user, as the support information, a notification that the printing is ready if the imposition information is changed.

13. The information processing system according to claim 12, wherein the one or more processors are configured to perform control to, in addition to providing the notification that the printing is ready if the imposition information is changed, notify the user of the range of identification numbers of pieces of image data for which printing is ready among the pieces of image data that have been received.

14. The information processing system according to claim 1, wherein the one or more processors are further configured to generate and notify the user of support information based on the imposition information, the support information including at least one of:

a range of identification numbers of pieces of image data for which printing is ready, an indication that printing would be ready if the imposition information is changed, a range of identification numbers that would be ready if the imposition information is changed, and a ratio of print-ready pieces of image data relative to a total number of pieces of image data constituting the document data.

15. A non-transitory computer readable medium storing a program causing a computer to execute a process for information processing, the process comprising:

acquiring document data and imposition information, the document data being constituted by a plurality of pieces of image data, the imposition information being information about imposition of the document data; and if pieces of image data, among the plurality of pieces of image data, to be imposed on one or more pages have been received, the one or more pages being included in a plurality of pages that serve as printing surfaces of sheets on which the document data is to be printed based on the imposition information, performing control to notify a user that printing of the one or more pages is ready, wherein the performing control to notify the user that printing of the one or more pages is ready is performed before completion of receipt of all the pieces of image data constituting the document data.

16. An information processing method comprising:

acquiring document data and imposition information, the document data being constituted by a plurality of pieces of image data, the imposition information being information about imposition of the document data; and if pieces of image data, among the plurality of pieces of image data, to be imposed on one or more pages have been received, the one or more pages being included in a plurality of pages that serve as printing surfaces of sheets on which the document data is to be printed based on the imposition information, performing control to notify a user that printing of the one or more pages is ready, wherein the performing control to notify the user that printing of the one or more pages is ready is performed before completion of receipt of all the pieces of image data constituting the document data.

* * * * *